United States Patent [19]

Kobori et al.

[11] Patent Number: 4,703,366

[45] Date of Patent: Oct. 27, 1987

[54] VIDEO IMAGE PRINTER FOR PRINTING AN IMAGE DERIVED FROM A VIDEO SIGNAL

[75] Inventors: Yasunori Kobori; Kentaro Hanma, both of Yokohama; Toshihiko Gotoh, Tokyo, all of Japan

[73] Assignee: Hitachi, Ltd., Tokyo, Japan

[21] Appl. No.: 739,328

[22] Filed: May 31, 1985

[30] Foreign Application Priority Data

Jun. 1, 1984 [JP] Japan ............................. 59-110750
Nov. 2, 1984 [JP] Japan ............................. 59-230146

[51] Int. Cl.⁴ .............................................. H04N 5/76
[52] U.S. Cl. ...................................... 358/335; 358/302
[58] Field of Search ............... 360/35.1, 335; 358/906, 358/909, 302; 101/109

[56] References Cited

U.S. PATENT DOCUMENTS 4,484,233 11/1984 Strout et al. ........................ 358/302
4,492,161 1/1985 Johnson et al. ..................... 101/109
4,503,466 3/1985 Ryan ................................. 358/906 X
4,604,668 8/1986 Lemelson ........................ 358/906 X Primary Examiner—Robert L. Richardson
Attorney, Agent, or Firm—Antonelli, Terry & Wands

[57] ABSTRACT

Disclosed is a video image printer for printing a video image of an input video signal onto a printing paper, in which a medium, such as a magnetic sheet disc or magnetic tape for a video cassette recorder, capable of recording/reproducing the information of the video image is employed. In order to obtain a reproduced video signal from the recording/reproducing medium with normal-operation, the video image printer is provided with a mechanical vibration-absorbing mechanism and an electrical reproduced signal correction circuit. Depending upon the requirements of the situation, a plurality of recording/reproducing heads are provided so as to make it possible to record a video image to be printed on the recording/reproducing medium during the printing operation of a previously selected video image.

10 Claims, 24 Drawing Figures

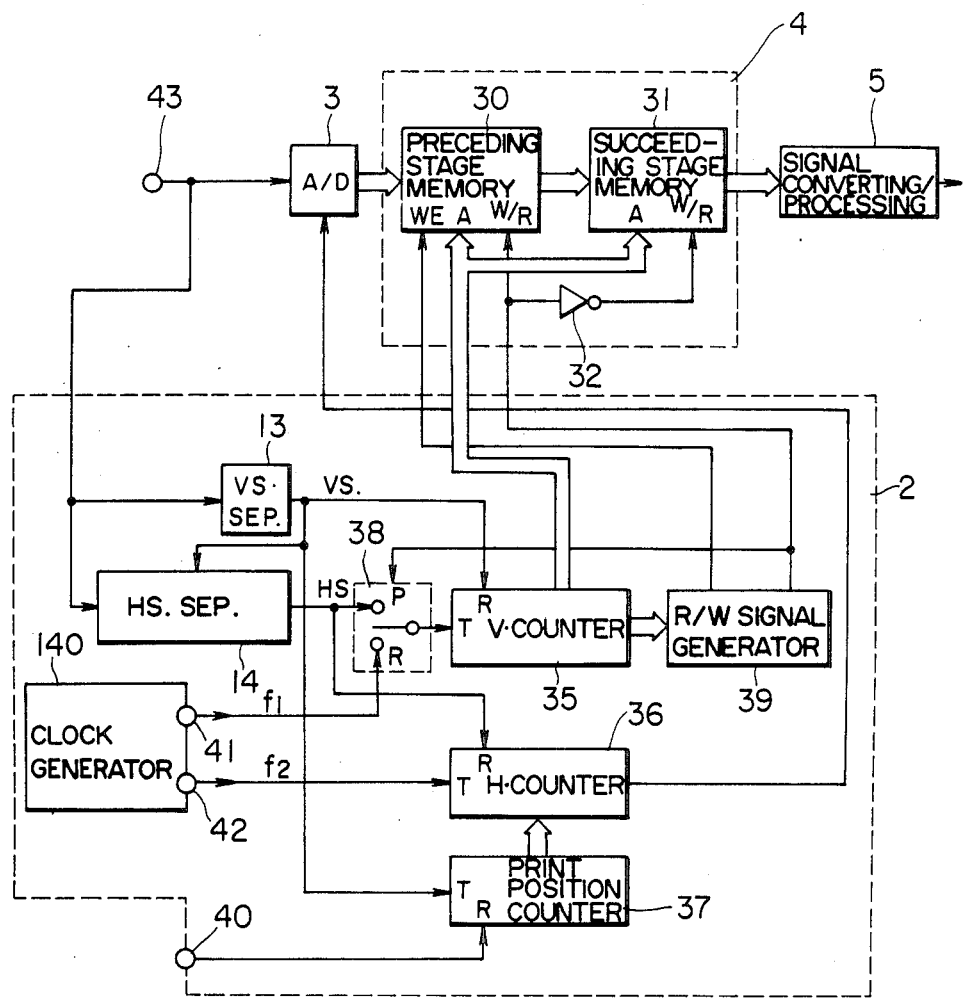
F I G. 4

(a) VS
(b) AFC·HS
(c) DELAY OUTPUT
(d) SHAPER OUTPUT
(e) LATCH OUTPUT
(f) GATE OUTPUT

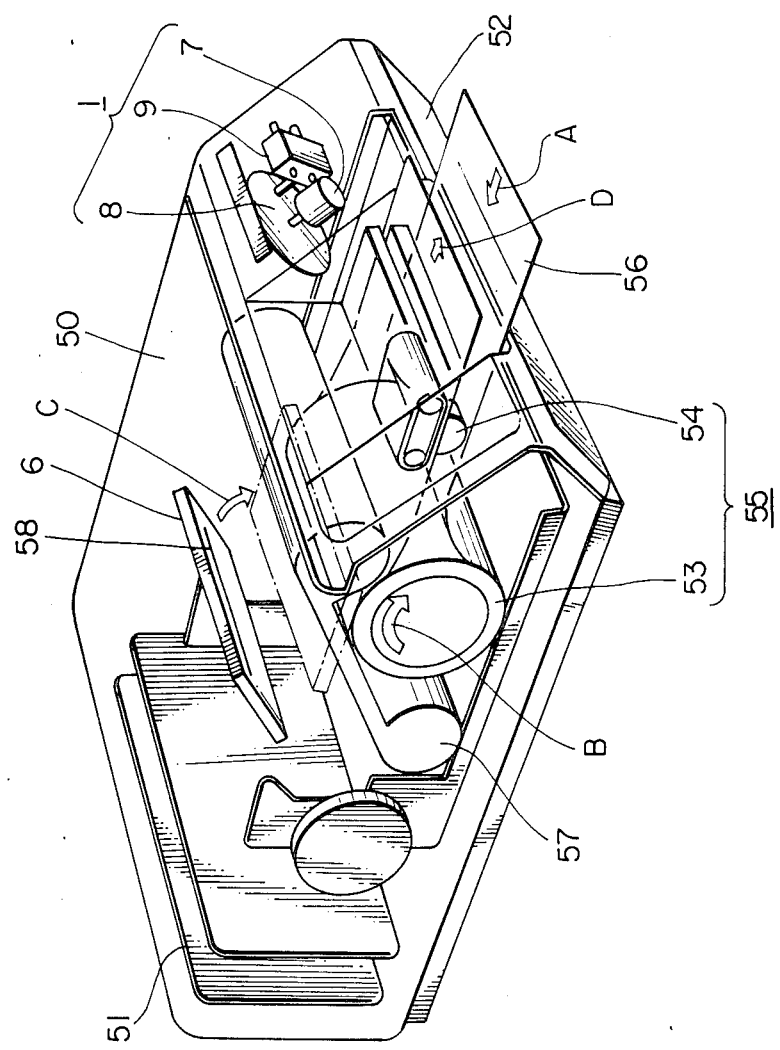

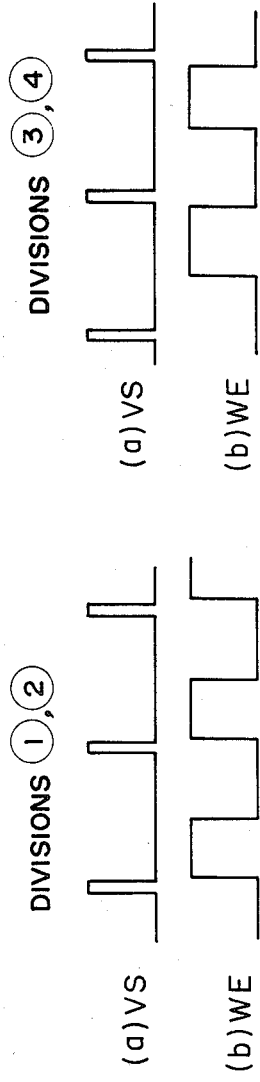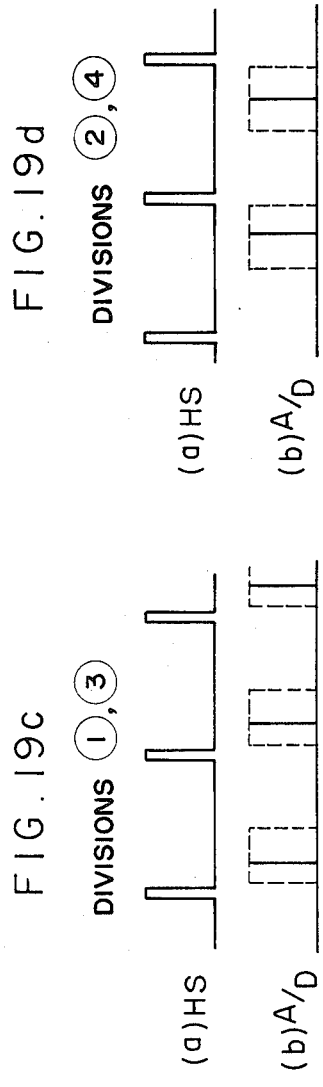

VIDEO IMAGE PRINTER FOR PRINTING AN IMAGE DERIVED FROM A VIDEO SIGNAL

BACKGROUND OF THE INVENTION

The present invention generally relates to a printing device for printing on printing paper a video image displayed on the screen of a television or the like and particularly to a video image printer which is suitable for preserving a video signal or a plurality of video signals to be printed.

A conventional video image printer is provided with a semiconductor frame memory, in which one frame of image a video signal can be instantly stored in the frame memory, for example, as disclosed by JP-A 56-64884. In the video image printer using such a frame memory, there have been such advantages that one scene of successive television pictures can be instantly (accurately in 1/30 or 1/25 sec) stored and that a picture can be reproduced with fidelity to a stored video signal without any skew. In such a video image printer, however, a number of random access memories (hereinafter, referred to as RAMs) have been required as the semiconductor storage elements in the frame memory and therefore the printer has become extremely expensive in manufacturing cost and large in size. Further, in the video image printer of the frame memory type using RAMs, there has been such a disadvantage that the stored video signal or information was extinguished when a power supply was turned off because the content of the RAMs were electrically and temporarily stored.

In the case where one scene of moving pictures such as television pictures or the like was printed onto printing paper, consideration has not been taken with respect to a possible state in which a desired picture to be printed next might be displayed in printing any preceding picture. That is, since a video signal of only one video image was recorded in a frame memory and printed while reading-out this recorded picture from the frame memory, another picture to be printed next could not be applied to the frame memory to be memorized therein in printing the first-memorized picture, otherwise it was necessary to extinguish the picture being printed to memorize the other picture to be printed next. Such problems as described above have not yet been solved.

SUMMARY OF THE INVENTION

An object of the present invention is to provide a video image printer in which it is possible to realize reduction in cost of an image information storage and permanent preservation of the stored video signal or information, which have not been solved in the prior art.

Another object of the present invention is to provide a video image printer in which a printed video image having no skew or fluctuations can be obtained without being affected by any external mechanical vibrations.

Still another object of the present invention is to provide a video image printer in which a picture to be printed next can be recorded while printing any other picture.

According to an aspect of the present invention, the video image printer is arranged such that a magnetic recording/reproducing means are provided in place of a frame memory, and such that a mechanical vibration-absorbing device and an electronic circuit for absorbing vibrations are additionally provided to the magnetic recording/reproducing means so as to absorb a high-frequency external vibration and a low-frequency vibration respectively, so that a recording/reproducing operation of a picture to be printed and a picture which is being printed are not affected at all by external vibrations. Furthermore, the video image printer is arranged such that printing can be satisfactorily performed even if a synchronizing signal is lacking in a reproduced video signal.

According to another aspect of the present invention, the video image printer is arranged such that a magnetic recording/reproducing system is provided in place of a frame memory and such that a plurality of tracks for recording frame signals are provided in the system. This enables the same frame signal to be repeatedly reproduced in printing and, at the same time, allows another frame signal to be recorded even during the printing operation.

The above and other objects, features, and advantages of the present invention will be more apparent from the following description with reference to the accompanying drawings.

BRIEF DESCRIPTION OF THE DRAWINGS

FIG. 4 is a block diagram showing an embodiment of the signal processing means of FIG. 1;

FIG. 15 is a perspective view showing the arrangement of the video image printer according to the present invention;

FIGS. 19a, 19b, 19c, and 19d are main part waveform diagrams of FIG. 17.

DESCRIPTION OF THE PREFERRED EMBODIMENTS

Figure 1:
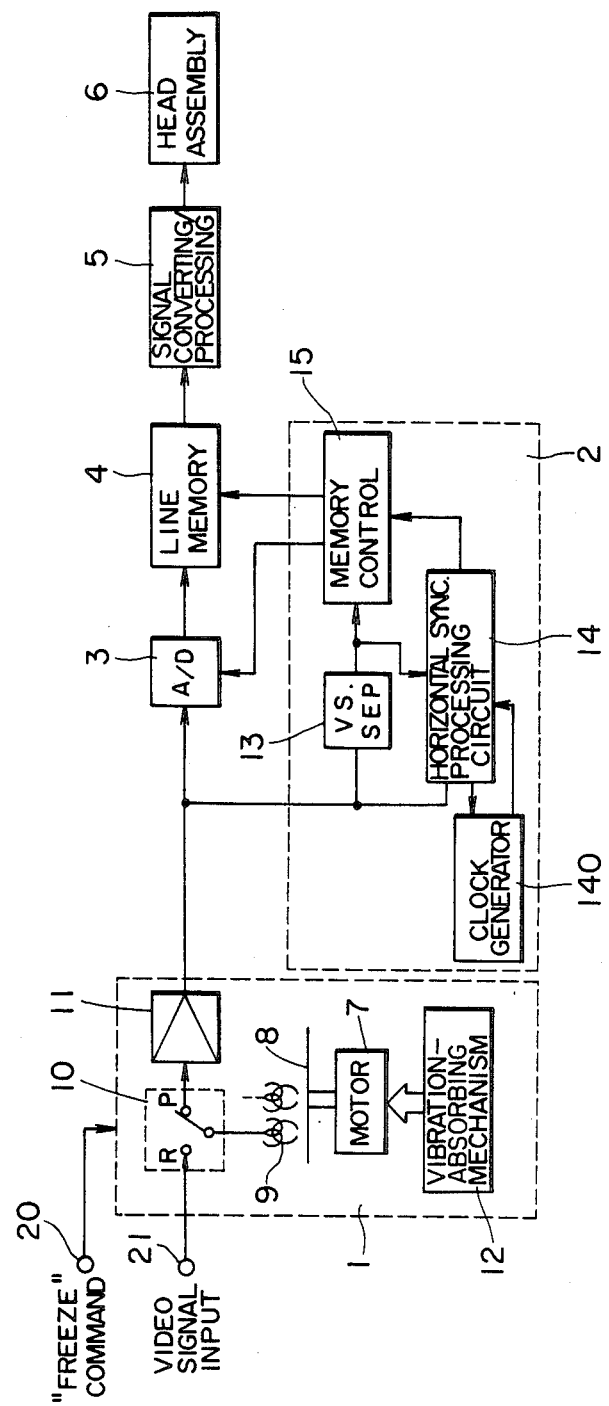
FIG. 1 is a block diagram showing an embodiment of the video image printer according to the present invention.

Referring to FIG. 1, an embodiment of the video image printer according to the present invention will be described. In the drawing, there are provided a signal storage means 1, a signal control means 2 or a memory controller, an analog/digital converter 3 (hereinafter, referred to as an A/D converter), a line memory 4, a signal converting processing means 5, and a printing head assembly 6. The signal storage means 1 is constituted by a disc motor 7, a magnetic sheet disc 8, a recording/reproducing head 9, a recording/reproducing switch 10, a reproducing amplifier 11, and a vibration absorbing mechanical means 12. On the other hand, the signal control means 2 is constituted by a vertical synchronizing signal separator circuit 13 (hereinafter, referred to as a VS.SEP), a horizontal synchronizing signal processing means 14, a memory control means 15, and a clock generating means 140.

Next, the whole operation will be described. A video signal, used for example in a television, from a video signal input terminal is recorded or "frozen" by one frame (or by two fields) on the magnetic sheet disc 8 by the recording/reproducing head 9 through the recording/reproducing switch 10 in response to a "freeze" command. The time for recording in this case is one frame period, that is, 33 msec or 40 msec, which is determined depending on the form of the television signal and therefore the video signal is substantially instantly recorded.

The recording/reproducing switch 10 is connected to the reproducing amplifier 11 immediately after a recording operation is ended and the recorded video signal is repeatedly reproduced by the magnetic sheet disc 8 to generate a plurality of frames each having the same video signal. In this case, the disc motor 7, the recording/reproducing head 9 and the like are all protected from vibrations by the vibration-absorbing mechanical means 12 during the recording/reproducing operation and the detailed description thereabout will be made later.

Now a reproduced video output from the reproducing amplifier 11 is applied to the A/D converter 3 and the signal control means 2 in the succeeding stage. The conversion timing of the A/D converter 3 and the address of the line memory 4 for storing the converted digital signal are all controlled by the memory control means 15 in the signal control means 2. In the A/D converter 3, the amplitudes of the repeatedly reproduced video signal required for every one line to be printed ($V_p$ in FIG. 5a) are converted into digital signals and then held in the line memory 4. In the case of color printing, the line memory 4 must have three units, in principle, for tri-colors respectively and each unit must be constituted by a plurality of bits for gradation of every picture element. However, the line memory 4 may have one unit in case the frame successive tri-color printing method is employed. In the memory control means 15, the A/D conversion timing and the memory address of the line memory 4 are determined on the basis of a vertical and a horizontal synchronizing signal (hereinafter referred to as a VS signal and an HS signal respectively) produced from the VS.SEP 13 and the horizontal synchronizing signal processing means 14, respectively, and a clock signal produced from the clock generator means 140.

Each of the digital signals held in the line memory 4 is transferred to the signal converting/processing means 5 in the succeeding stage and converted into a pulse signal of specified width for producing a half-tone concentration level be means of conventional thermal printing or ink-jet printing mechanisms. At that time, the transfer timing and the address of the line memory are all controlled by the memory control means 15. In the signal converting/processing means 5, applied color signal information, for example, the photo tri-colors such as red R, green G and blue B, are respectively subject to complemental conversion into the print tri-colors such as cyanic color Cy, Magenta Mg, and yellow Ye, which are respectively related to the photo tri-colors as the complemental ones, and thereafter, are respectively converted into energy information corresponding to the input digital quantities representing gradation of every picture element. Here, the energy information is a parameter for varying the quantity of energy to be applied to the head assembly 6 in the succeeding stage. For example, in the case of a thermal head and an ink jet head, the parameter may be a drive pulse width from the converting, processing means 5 and an applied voltage or in the case of a head assembly carrying a thermal head, generally, the quantity of heat generation is controlled by varying a pulse width to be applied from the converting/processing means 5 to adjust the concentration of half-tone.

Figure 2:
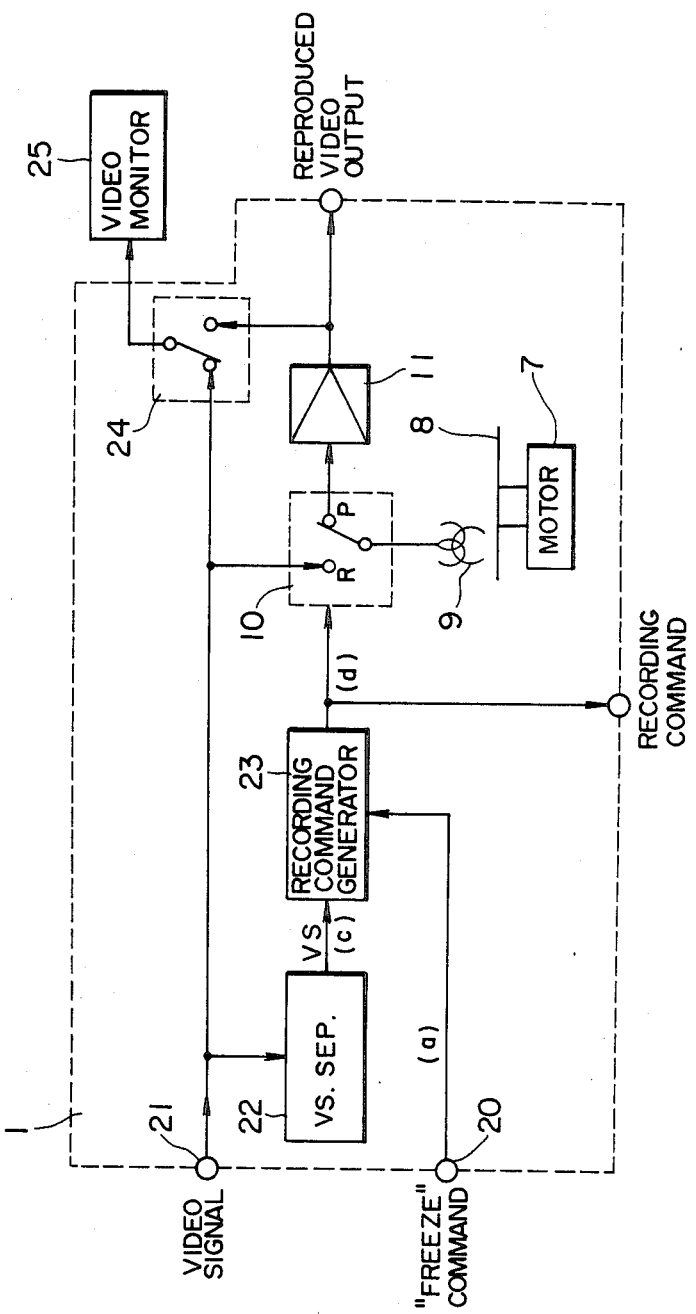
FIG. 2 is a block diagram showing an embodiment of the signal storage means of FIG. 1.
Figure 3:
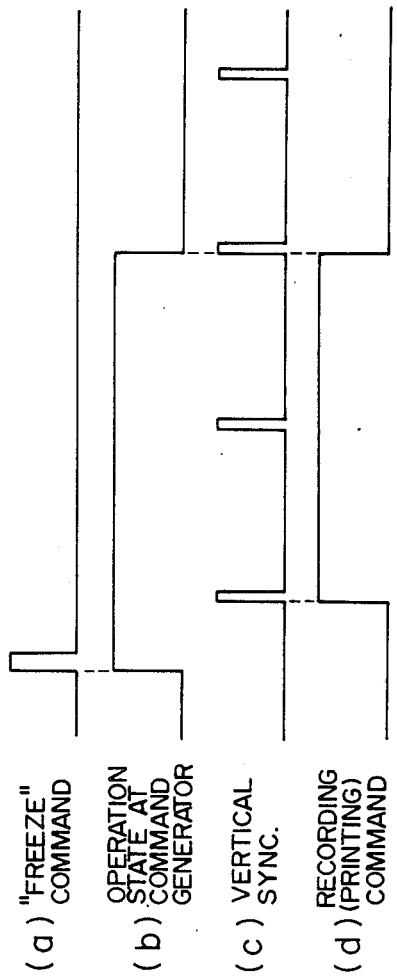
FIGS. 3a thru 3d are a main part waveform diagrams for explaining the operation of FIG. 2.

Next, referring to FIGS. 2 and 3, the arrangement and the operation of the signal storage means 1 will be described in detail. FIG. 2 is a diagram showing the detailed arrangement of the signal storage means 1 of FIG. 1. In FIG. 2, items functionally corresponding to items in FIG. 1 are correspondingly referenced. In the drawing, there are provided a "freeze" command input terminal 20, a video signal input terminal 21, a vertical synchronizing signal separator means 22 and a recording command generating section 23. Further, generally, in order to check a video signal to be recorded and a recorded signal, a video monitor 25 is required and also a monitor switch 24 is provided for changing-over an input to the monitor 25.

In this case, a "freeze" command is a command for taking out one scene of successive moving pictures and for causing the sheet disc 8 to record a video signal by one frame in the case of the embodiment according to the present invention. When a "freeze" command signal is applied in the form of a pulse as shown in FIG. 3(a), the recording command generating section 23 is changed into the operation mode from the standing-by mode so as to await a VS signal to be applied as shown in FIG. 3(c). When the VS signal is applied, the state of a recording command signal is reversed into an "H" level from an "L" level as shown in FIG. 3(d). At the same time, the connection of a recording/reproducing switch 10 is changed-over to the recording contact (R) from the reproducing contact (P) and the input video signal is recorded for one frame on the sheet disc 8 by the recording/reproducing head 9. When a video signal for one frame (which is equal to signals for two fields) has been recorded after initiation of recording, the recording command signal is returned to the "L" level again as shown in FIG. 3(d) and the connection of the recording/reproducing switch 10 is also returned to the contact (P). As a matter of course, the recording/reproducing head 9 is automatically changed-over into a reproducing mode and the frame signal which has been recorded immediately before is repeatedly reproduced to generate a plurality of frames each having the same video signal.

In this case, the vertical synchronizing signal separator means 22 may be of the kind generally used in a television and a VTR, and the sheet disc 8 may be a 2-inch disc of the cassette type used for an electronic camera, that is a so-called "video floppy". Further, the amount of data per number of revolutions of the sheet disc 8 may be one frame per revolution in the embodiment. The monitor switch 24 may be operated automatically, or alternatively, manually according to the present invention.

Next, referring to FIGS. 4 and 5, the arrangement and the operation of the signal control means 2 will be described in detail. In FIG. 4, items functionally corresponding to items in FIG. 1 are correspondingly referenced. First, the line memory 4 is constituted by a preceding stage memory 30, a succeeding stage memory 31 and an inverter 32 for performing write/read (hereinafter, referred to as W/R) controlling. On the other hand, the signal control means 2 is constituted by the VS.SEP means 13, the horizontal synchronizing signal separator means 14, a vertical counter 35, a horizontal counter 36, a print position counter 37, a clock switch 38, and a W/R signal generating means 39. There is further provided a printing command input terminal 40, clock output terminals 41 and 42 of the clock generating means 140 and a reproduced video signal input termnal 43.

A separated horizontal synchronizing signal (hereinafter, referred to as an HS signal) of the video signal repeatedly reproduced from the sheet disc 8 is connected to a reset terminal R of the horizontal counter 36 and a trigger input T of the vertical counter 35 through the clock switch 38, while a separated VS signal is connected to a reset terminal R of the vertical counter 35 and a trigger input T of the print position counter 37. The output bits of the vertical counter 35 are used as an address signal of the line memory 4.

Figure 5A:
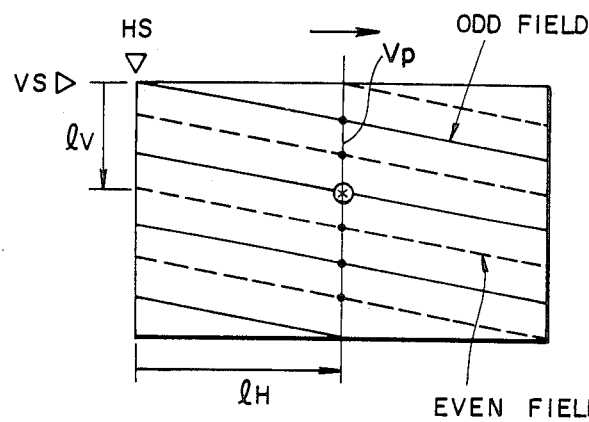
FIGS. 5a and 5b are diagrams for explaining the operation of the signal processing means of FIG. 4.

Now, the operation of the signal processing means 2 will be described. The print position counter 37 is reset in response to a printing command signal (which may be equal to a recording command signal shown in FIG. 3(d)) from the input terminal 40. The VS signal is applied to the counter 37 and the number of frames is counted therein. For example, the lower most bit of the output of the counter 37 is not used as a counter output signal, so that in the output of the counter 37, frame count value $N_F$ is changed by one when two VS signals are applied. A preset or threshold count value $N_H$ of the horizontal counter 36 is determined by the frame count value $N_F$. The value $N_H$ determines a horizontal position $l_H$ of a vertical printing line $V_p$ from occurrence of the HS signal as shown in FIG. 5a, which is a diagram of a television scanning line. In contrast, the vertical counter 35 is reset in response to a VS signal and thereafter counts the HS signal. The count $N_V$ of the vertical counter 35 determines a vertical position $l_V$ of the vertical printing line $V_p$ shown in FIG. 5a. The W/R signal generating means 39 is operated in accordance with the count $N_V$.

In FIG. 5a, scanning lines drawn by solid lines represent an odd field while the other scanning lines drawn by broken lines represents an even field, and the HS and VS signals occur in the upper left end portions respectively.

Figure 6:
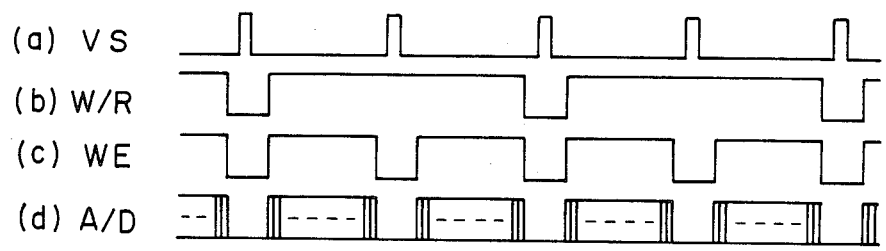
FIGS. 6a thru 6d and 7a thru 7c are main part waveform diagrams of FIG. 4.

Now, the printing procedure of the printer is such that, as shown in FIG. 5a, a vertical line ($V_p$ in FIG. 5a) which is produced during one line of the reproduced video signal is determined to be one printing line, and the printing line is shifted successively rightward immediately after the application of an HS signal one line after another, the printing is terminated when the right end is reached. That is, the scanning lines $V_p$ of the printer are crossed with the scanning lines of a video picture at substantially right angles. The print timing of each line $V_p$ is controlled on the basis of a W/R signal or the like, as shown in FIG. 6. The conversion timing of the A/D converter 3 is determined in accordance with the clock frequency of the clock generating means 140 and controlled by the counter 36 such that conversion is performed with a predetermined delay from generation of each HS signal, during one frame period.

First, a W/R signal shown in FIG. 6(b) represents one frame period and the A/D conversion information for one vertical line in which the odd and even fields are added to each other as shown in FIG. 5 is written into the preceding stage memory 30 of the line memory 4 when the W/R signal is in its W mode of about one frame period and in its write enable (hereinafter, referred to as WE) mode of a WE signal shown in FIG. 6(c). The W/R signal has an "L" level period of about 20H (H represents a period of a horizontal synchronizing signal) including the periods before and after the VS signal, that is, an R mode period for every frame period. In this R mode period, such memory information as described above is read-out from the preceding stage memory 30 in a short time and written into the succeeding stage memory 31. Thereafter, as soon as A/D conversion of the next line $V_p$ is initiated, the preceding and succeeding stage memories 30 and 31 are changed again into the W and R modes respectively and the information of the succeeding memory 31 is transferred to the signal converting/processing means 5 in the succeeding stage. Thus, the modes of the preceding and succeeding stage memories 30 and 31 are in opposition to each other, and, to this end the inverter 32 is used. The address of the line memory 4 is determined on the basis of the output bits of the vertical counter 35, for example, 9 bits when resolution of the $l_v$ is 512 dots at most, as described above. When the W/R signal is in its W mode, the clock switch 38 is connected to the contact (P) and an HS signal is applied to the vertical counter 35. Here, the number of the HS signal is counted after generation of the VS signal so as to form an address signal of the preceding stage memory 30 of the line memory 4. Practically, the writing operation of the preceding stage memoy 30 is controlled, as shown in FIG. 6(c), on the basis of the WE signal generated by the W/R signal generating means 39, in addition to the W/R signal, as described above. On the other hand, when the W/R signal is in its R mode, the clock switch 38 is connected to the contact (R), and a high frequency clock signal from the clock generating means 140 is applied to the vertical counter 35. The frequency $f_1$ of the clock signal has a value which is enough to transfer A/D converted data for one frame (about 480 pulses) from the preceding memory 30 to the succeeding memory 31 during the "L" level period (about 20H) of the W/R signal. The value may be about 1 MHz.

The A/D conversion signal is generated by the horizontal counter 36 and the preset or theshold count value $N_H$ thereof is determined by the print position counter 37, the value $N_H$ being fixed during one frame. The operation of the horizontal counter 36 is such that the counter 36 is reset in response to an HS signal and counts the clock signal from the clock generating means 140. The counter 36 produces an A/D conversion signal as shown in FIG. 7(c) to indicate the initiation timing of A/D conversion after the count has reached the value $N_H$. In this case, the frequency $f_2$ of the clock signal from the clock generating means 140 determines horizontal notches between the vertical lines $V_p$, that is the resolution, the value being generally set to be about 10 MHz.

In addition to the foregoing description, the relation between the print timing for every line $V_p$ to be printed and the rotational phase of the rotary recording/reproducing medium or sheet disc 8 of the storage means will be described. The sheet disc 8 shown in FIG. 5b may rotate at the period of a VS signal or two times as long as the same so as to reproduce or video signal for one field or one frame per one revolution, respectively.

Figure 5B:
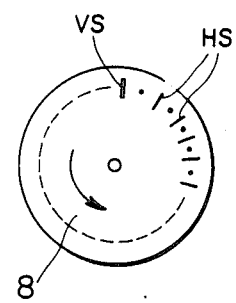
Figure 7:
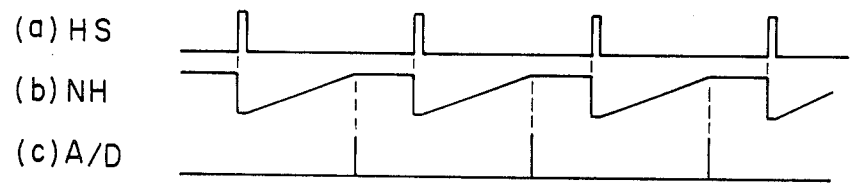

Now description will be made as to the case where a vertical line $V_p$ shown in FIG. 5 is printed. First, when a reproduced VS signal is produced, the vertical counter 35 shown in FIG. 4 starts to count an HS signal. At this time, the sampling timing for every period of HS signal shown by the $l_H$ of FIG. 5 is determined by the print position counter 37 shown in FIG. 4 and the position $l_H$ is held to be constant during every one frame period. At this time, as shown in FIG. 7, A/D converted digital signals reproduced in every period of HS signal, that is, reproduced from a point on the track of the sheet disc 8 shown in FIG. 5b corresponding to the preset or threshold count value $N_H$ of the horizontal counter 36, is successively memorized in the line memory 4. This operation is successively performed in response to every HS signal to record information i.e. the converted signals of one vertical line $V_p$ for one frame into the line memory 4.

Immediately after completion of recording into the line memory 4, a reproduced VS signal is produced again so that the information in the line memory 4 is transferred to the signal processing means 5 in the next state in response to this VS signal and printing is initiated. In this printing operation, the line information to be printed next is reproduced from the sheet disc 8 and memorized in the preceding stage memory 30 of the line memory 4.

Thus, the print initiation timing and the data transfer timing from the line memory 4 to the signal processing means 5 are all controlled on the basis of the VS signal reproduced repeatedly from the sheet disc 8, that is, the reproduced video signal. As a matter of course, the reproduced video signal is synchronized with the revolution of the sheet disc 8 and therefore it will be well understood that the rotational signal of the sheet disc 8 or the disc motor 7 can be used in place of such a reproduced video signal as described above.

In addition to the foregoing description, the relation between the signal storage means 1, the signal processing means 2 and the printing head assembly 6, and the features thereof will be described further in detail. The present invention is featured not only in the sheet disc 8 at the rotary recording/reproducing medium is utilized in place of the conventional frame memory, but in that as the most important feature, there is further provided the controlling means for controlling transfer timing and printing timing of recorded information. Referring to FIGS. 2 and 4, the transfer timing will be described. A recorded video signal as recorded information on the sheet disc 8 is always repeatedly reproduced by the head 9 as shown in FIG. 2 and this reproduced information is successively transferred to the signal processing means 2 in the succeeding stage as shown in FIG. 4. In the signal processing means 2, conversion timing of the A/D converter 10 is determined by the horizontal counter 36 and the print position counter 37 on the basis of a reproduced HS signal. On the other hand, writing timing to the line memory 4 is determined by the vertical counter 35 and the W/R signal generating means 39 on the basis of reproduced VS and HS signals That is, all the information transfer timing to the line memory 4 is determined on the basis of the reproduced signals (that is, the VS and HS signals) from the rotary recording/reproducing medium. In other words, all the information transfer timing from the signal storage means 1 to the line memory 4 is determined by the counters, etc., in the signal processing means 2 on the basis of only the reproduced signals.

Next, description will be made as to the information transfer timing from the line memory 4 to the printing head assembly 6. The transfer timing is made to agree with the printing timing and determined in accordance with print ending timing of each line $V_p$ and paper feed timing of the printing paper. Generally, the paper feed timing is produced after printing of each line $V_p$ has been ended, and in response to the produced paper feed timing the printing information for the next line $V_p$ is transferred from the line memory 4 to the printing head assembly 6 so as to start printing of the next line $V_p$.

In the foregoing description, each line to be printed has been described as a vertical line $V_p$ on the screen of a television as shown in FIG. 5, however, the arrangement shown in FIG. 1 needs not be changed at all even if the line is made as a horizontal line and a printing operation is performed in the same direction as television scanning lines.

In the manner as described above, by using a sheet disc as a signal storage means, it is possible to permanently preserve stored information without being extinguished even if a power source would be turned off. Moreover, an inexpensive arrangement can be obtained by using a conventional recording/reproducing device which has been widely used without employing a number of expensive semiconductor memories.

Further, if it is intended to store a video image to be printed next, while printing another video image, the device may be modified in such a manner as follows. A disc having a plurality of tracks is employed as the sheet disc 8. When a "freeze" command is in a printing operation, the printing operation is stopped only for one frame period as soon as printing of one line $V_p$ being printed is ended. A picture to be printed next is recorded to the next track on the disc. It is a matter of course that a paper feeding operation is stopped during stoppage of the printing operation. Alternatively, a plurality of recording/reproducing heads each as shown in FIG. 1 are prepared, so that a picture to be printed next can be recorded independently without stopping the printing operation.

Figure 8:
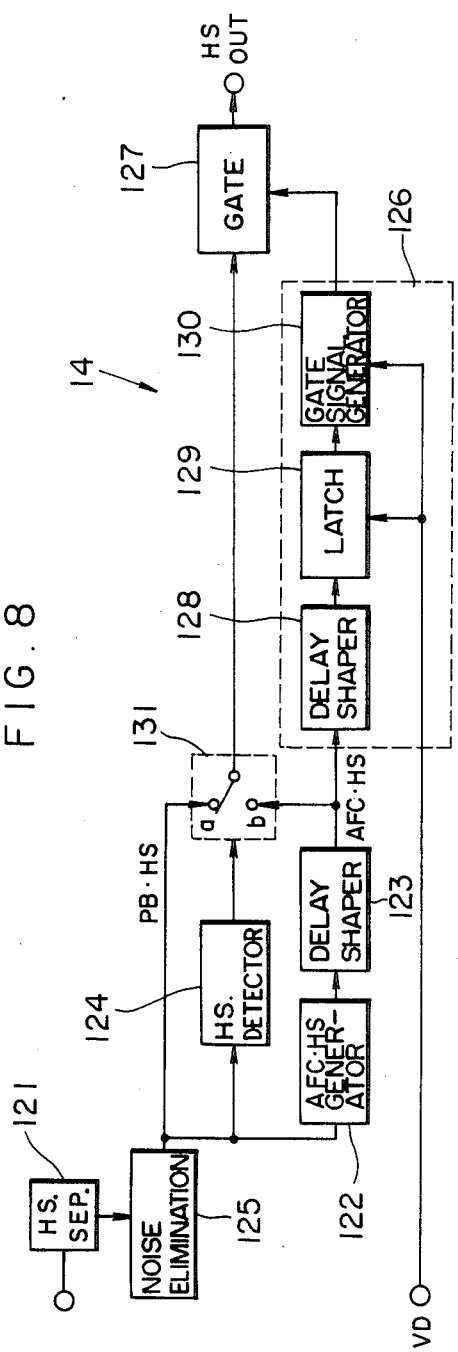
FIG. 8 is a block diagram showing an embodiment of the horizontal synchronizing processing means of FIG. 1.
Figure 9:
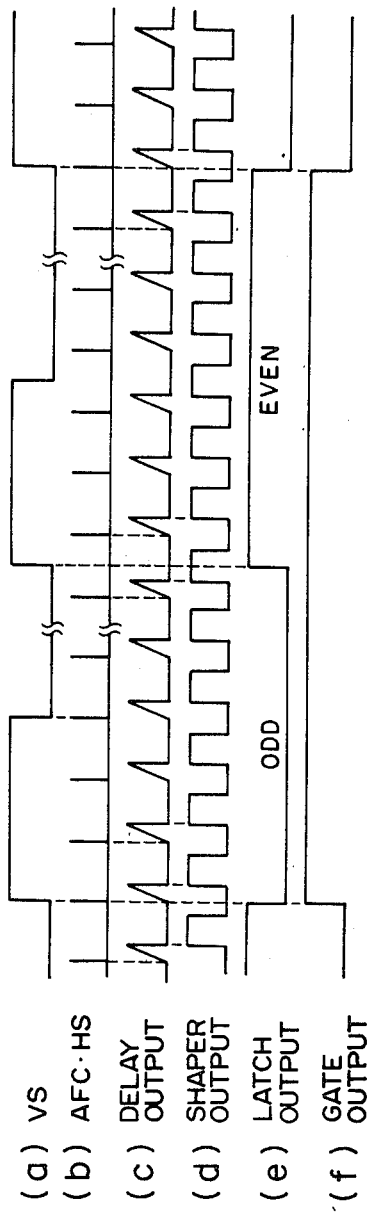
FIGS. 9a thru 9f are main part waveform diagrams of FIG. 8.

Next, referring to FIGS. 8 and 9, an embodiment of the horizontal synchronizing processing means 14 will be described. In FIG. 8, there are provided a horizontal synchronzing signal separator circuit (hereinafter, referred to as an HS.SEP) 121, an HS generator of the automatic frequency control type (hereinafter, referred to as an AFC.HS generator) 122, a delay shaper circuit 123, an HS detector means 124, a noise elimination circuit 125, a field discrimination means 126, a gate circuit 127, and an HS.SW 131. The field discrimination means 126 is constituted by a delay shaper means 128, a latch circuit 129, and a gate signal generator 130.

The operation of the horizontal synchronizing processing means 14 will be described. First, an HS signal is separated from a repeatedly reproduced video signal by the HS.SEP 121. The HS.SEP 121 may be such an ordinary means as used in a television and a VTR. The HS signal is applied to the noise elimination circuit 125, the AFC.HS generator 122, and the HS detector means 124. When a normal reproduced video signal in which an HS signal is not lacking is applied, the output of the HS detector means 124 is in its "L" level and the HS.switch 131 is connected to the noise elimination circuit 125 at terminal (a), so that a reproduced signal HS from the noise elimination circuit 125 (hereinafter, referred to as a PB.HS signal) is produced through the HS.switch 131. In the AFC.HS generator 122, the output AFC.HS has no skew even if the input HS has a skew having a frequency higher than, for example, 100 Hz. Relative to a skew having a frequency lower than 100 Hz, the AFC.HS generator 122 operates with such a time constant as to cause the output to generally follow the skew. Generally, since an AFC.HS signal is different in phase from an input PB.HS signal even in the normal signal state, the phase and the pulse width of the former are matched with those of the latter in the delay sharper circuit 123 in the succeeding stage. The HS detector means 124 always detects lack of an HS signal in the PB.HS signal, and when lack of an HS signal occurs, the output thereof becomes an "H" level so as to change the HS.switch 131 to the (b) terminal to thereby produce the AFC.HS signal through the HS.switch 131.

The field discrimination means 126 judges whether a field is an odd one or an even one in memorizing signals. The means 126 is provided for determining a field to be A/D-converted for printing and is therefore indispensable in a frame picture printer. The means 126 operates to compare the phases of a VS signal and an AFC.HS signal with each other as shown in FIG. 9. That is, the odd field starts from a point in which an HS signal appears at the leading edge of a VS signal while the even field starts from a point in which an HS signal does not appear at the leading edge of the VS signal, but is delayed a half period. In FIG. 9, a frame starts from an odd field. In FIG. 8, the delay shaper means 128 may be constituted by monostable multivibrators connected in the form of a two-stage cascade. Alternatively, the delay shaper means 128 may be arranged as a counter triggered by an HS signal to thereby easily obtain such a signal as shown in FIG. 9(d). Further, the latch circuit 129 may be an ordinary delay flip-flop (also a so-called D-FF), and the D and trigger inputs thereof are supplied with the output from the delay shaper means 128 and the VS signal respectively so that the latch circuit 129 takes the output of the delay shaper means thereinto at the leading edge of the trigger signal. As shown in FIG. 9(f), the gate signal generator 130 produces an "H" level signal in the order of odd/even only for one frame period on the basis of the output signal (FIG. 9(e)) of the latch circuit 129 and the VS signal. HS signals for one frame period are produced from the gate signal circuit 127 in the succeeding stage on the basis of this gate signal (FIG. 9(f)). The HS signals are used for determining A/D conversion timing of a reproduced video signal and a memory address as shown in FIG. 4.

Figure 10:
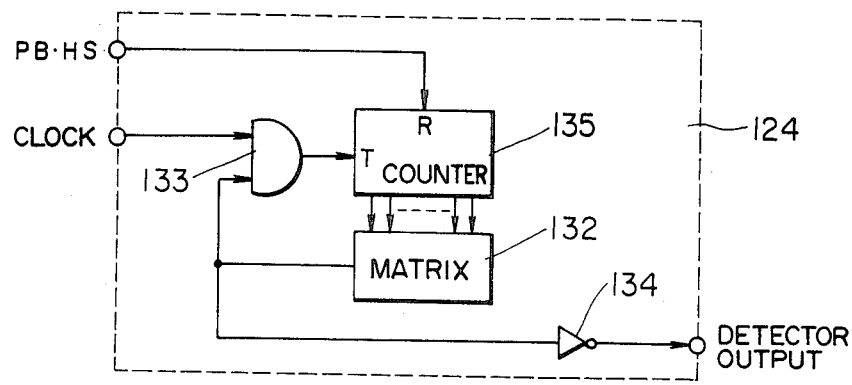
FIG. 10 is a block diagram showing an embodiment of the horizontal synchronizing detector means of FIG. 8.
Figure 11:
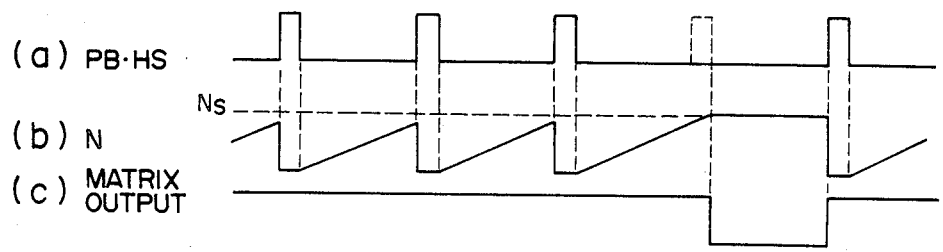
FIGS. 11a thru 11c are main part waveform diagrams of FIG. 10.

FIGS. 10 and 11 show an embodiment of the HS detector means 124 of FIG. 8. In FIG. 10, the HS detector means 124 is provided with a counter 135, a matrix 132 for changing-over an output of the counter 135 when the output reaches a value equal to or larger than a predetermined value, an AND gate 133, and an inverter 134. In the counter 135, the HS and clock signals are applied to the reset and trigger input terminals R and T respectively.

Next, the operation will be described. The counter 135 is reset in the period in which an HS signal is applied. As shown in FIG. 11, the counter 135 starts to count a clock signal immediately after the trailing edge of the HS signal (FIG. 11(a)) to correspondingly increase the count value N (FIG. 11(b)). In the matrix 32, the output becomes an "H" level in the case where the count value N is smaller than a threshold value $N_s$, while the output is changed into an "L" level when the count N reaches a value not smaller than the threshold value $N_s$. That is, the clock input is stopped by the AND gate 133, and, at the same time, the detector output is changed into the "H" level through the inverter 134.

Here, the threshold value $N_s$ substantially satisfies the following expression:

$$N_s = T_H/T_{cp}$$

where $T_{cp}$ and $T_H$ represent the clock period and the period of an HS signal respectively. It is a matter of course that the output of the HS detector means 124 is instantly reversed to the original state immediately after the application of the next HS signal.

Thus, the AFC.HS generator 22, the HS detector means 124 and the HS.switch 131 are provided in the horizontal synchronizing signal separator means 14, so that no malfunction is generated in the vertical counter 35 and the horizontal counter 36 in the succeeding stage shown in FIG. 4 because an AFC.HS signal is automatically produced even in the case where the PB.HS signals are partly lacking. That is, information can be held in proper order in the line memory 4 without any maladdressing, even if the HS signal is lacking in the reproduced video signal.

Figure 12:
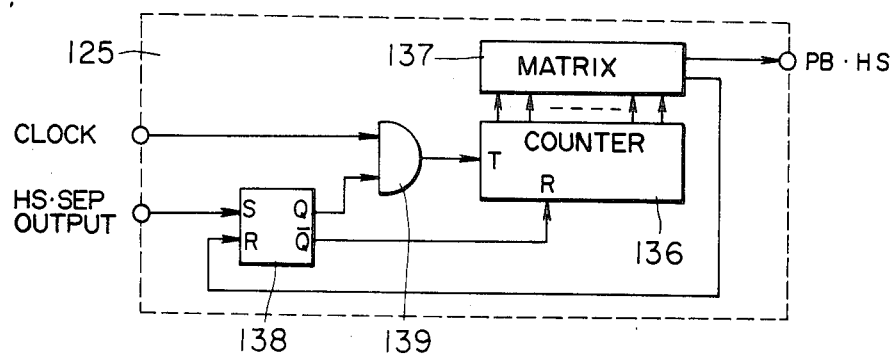
FIG. 12 is a block diagram showing an embodiment of the noise elimination circuit of FIG. 10.

Next, referring to FIGS. 12 and 13, an embodiment of the noise elimination circuit 125 will be described. In FIG. 12, the noise elimination circuit 125 is provided with a counter 136, a matrix 137, a flip-flop 138 (hereinafter, referred to as an FF) and an AND gate 139. The AND gate 139 is supplied with a positive-phase output Q of the FF 138 and a clock signal from the clock generating means 140 and produces an output applied to the trigger input T of the counter 136. The inverted output $\overline{Q}$ of the FF 138 is applied to the reset terminal R of the counter 136, and the respective bit information (that is a count value) of the counter 136 is applied to the matrix 137. The respective outputs of the matrix 137 and the VS.SEP are applied to the reset and set terminals R and S of the FF 138 respectively.

Figure 13:
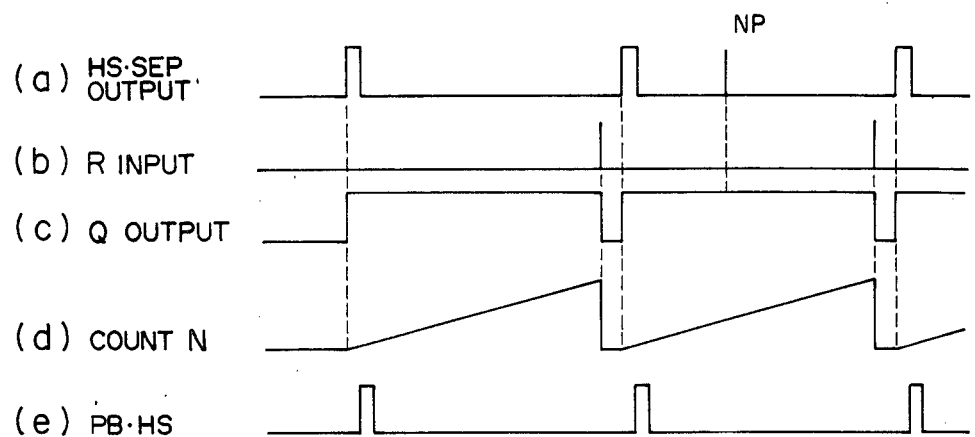
FIGS. 13a thru 13c are main part waveform diagrams of FIG. 12.

In FIG. 13, the operation will be described. First, in the state in which there is no HS signal in a HS.SEP output, the FF 138 is in the state of reset in which its positive phase output Q (FIG. 13(c)) and the inverted phase output $\overline{Q}$ are in "L" and "H" respectively. Therefore, the counter 135 is in the state of reset and the AND 139 is in the closed state. When an HS signal (FIG. 13(a)) is applied, the FF 138 inverts the states, so that the reset of the counter 136 is released and the AND gate 139 is opened to apply a clock signal (not-shown) to the terminal T of the counter 136, with the result that the counter 136 increases its count N. When the count N amounts to a threshold value $N_s$ of the matrix 137, the output of the matrix 137 (it is the same as the signal R in FIG. 13(b)) inverts the state into an "H" level. As a result, the FF 138 becomes instantly reset, so that the counter 136 is reset by the output of the FF 138 and the AND gate 139 is closed to become the former state. The reset state of the counter 136 is kept until a HS signal is produced next.

Next, the state in which a noise is included in the HS.SEP output (the state of NP in FIG. 13(a)) will be considered. The FF 138 is in the set state in which the positive phase output Q of the FF 138 is in its "H" level, that is, in the operating period of the counter 136, so that, even if noises exist in the HS signal, the noises are completely disregarded. Therefore, if the above-mentioned period is set to a value slightly shorter than the period of the HS signal (about 63.5 μsec) almost all the noises may be eliminated. The way of setting the above-mentioned period is the same as that in FIG. 10. Therefore, the output of the noise elimination circuit 125, that is, the PB.HS signal is generated in the matrix 137 (FIG. 13(e)). That is, the matrix circuit may be arranged such that the output PB.VS is made to be "H" only in the period from the state where the counter N of the counter 136 is "1" to the state of the count $N_H$ corresponding to the pulse width of the HS signal (about 5 μsec). Of course, alternatively, it is possible to obtain the PB.VS signal by shaping the waveform of the output of the FF 138 by differentiating the same.

Next, description will be made as to the case in which external vibrations, that is, mechanical vibrations, are produced in a video image printer. If no countermeasure is taken to cope with such mechanical vibrations, generally, a printed picture may include a skew portion in which straight lines are bent as a whole, or the upper portion of the picture is distorted. Further, if the mechanical vibrations are large, the field discrimination means 126 in FIG. 8 operates erroneously, so that in the printed picture the odd and even fields are exchanged for each other. The field discrimination means 126 may operate erroneously in such a state as follows. That is, when the offset in phase between the reproduced VS (FIG. 9(a)) and the AFC.HS (FIG. 9(b)) reaches ½ period of the HS signal, the latch output (FIG. 9(e)) is inverted, so that the field discrimination means 126 operates erroneously. Therefore, it is necessary to cause the vibration-absorbing mechanical means 12 in FIG. 1 to absorb all the mechanical vibrations which reach above ⅛ period of the HS signal, taking an allowance into consideration. At the same time, the vibration-absorbing mechanical means 12 is arranged so as to absorb also high frequency vibrations. The details will be described later. Therefore, an electric countermeasure for vibration-absorbing is performed such that the vibrations of low frequencies other than those described above and the vibrations of under ⅛ period of the HS signal are made to be registered with each other upon the above-mentioned frequencies and the period.

Figure 14:
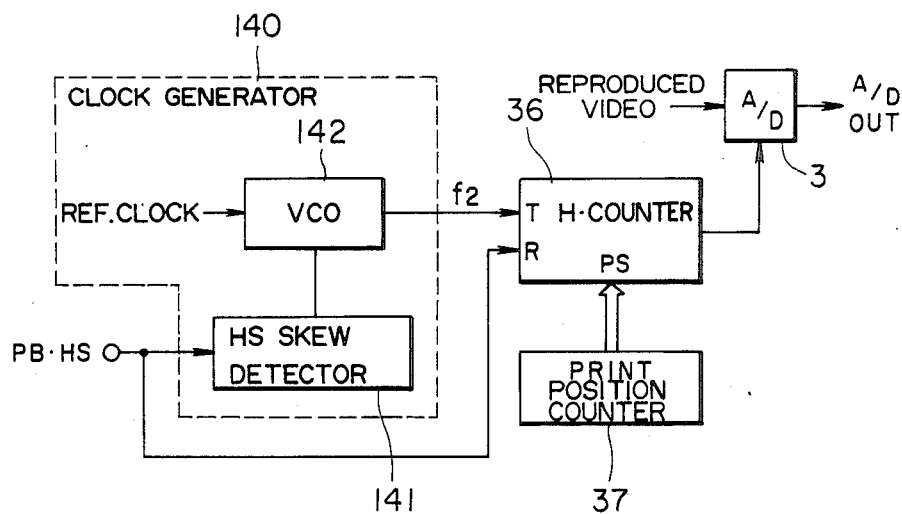
FIG. 14 is a block diagram showing an embodiment of the skew correcting means.

First, as an electrical vibration-absorbing means, the problem of lacking a synchronizing signal and the problem of noises in a synchronizing signal are solved by the arrangements as shown in FIGS. 10 and 12 respectively. Next, an embodiment means for correcting skew or shift of the horizontal synchronizing signal HS is shown in FIG. 14. In the drawing, items functionally corresponding to items in FIG. 2 are correspondingly referenced. In FIG. 14, the clock generating means 140 is constituted by an HS skew detecting means 141 and a voltage controlled oscillator 142 (hereinafter referred to as a VCO). The output of the HS skew detecting means 141 controls the VCO 142 and modulates the frequency of the clock output of the latter. The modulated clock is applied to the trigger input T of the horizontal counter 36 shown in FIG. 4 to determine the sample position in the horizontal direction ($l_H$ in FIG. 5). That is, the output $N_H$ of the horizontal counter 36 produced by frequency-dividing the modulated clock, is skewed or shifted corresponding to the magnitude of the modulation. That is, the sample timing of the A/D converter 3 is also skewed or shifted.

Therefore, if the sample timing of the A/D converter 3 is skewed or shifted in proportion to the skew or shift of the PB.HS, the A/D converter video image information becomes relatively the same as the video image information without any skew or shift. That is, if a reproduced skewed or fluctuated video image is A/D converted and printed by using the clock generator means 140 which varies the frequency of clocks in accordance with the fluctuations, a printed video image which has no skew or fluctuated portion can be obtained. It is preferable that the following frequency of the VCO 142 extends to a high band, however, unstable factors may correspondingly increase, therefore it is desirable to make the following frequencies under approximately two times the lowest value of the frequencies which can be absorbed by the vibration-absorbing mechanical means 12. The setting of the following frequency may be realized by inserting a low-pass filter in the output of the HS skew detecting means 141. The VCO 142 shown in FIG. 14 may be of the widely used time constant oscillating type. The HS skew detecting means 141 may be an ordinary frequency discriminator in view of its functional object, and, for example, a frequency/voltage converter may be satisfactorily employed.

In the foregoing description about each embodiment, a magnetic reproducing means such as a magnetic sheet is used as a storage medium in the signal storage means 1, however, the present invention is not limited to the use of such a magnetic recording/reproducing means but other devices such as an optical recording/reproducing means may be employed. Further, the foregoing description is made as to printing of a frame picture, however, printing of a field picture can be performed without changing the basic arrangement.

Figure 16A:
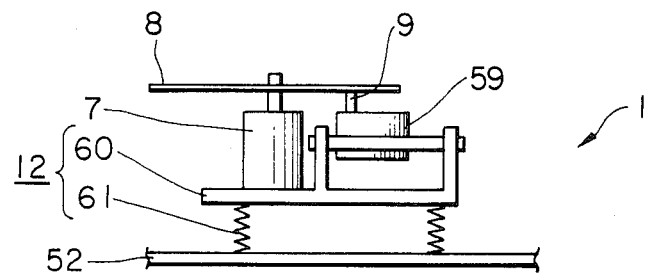
FIGS. 16a and 16b are diagrams showing the arrangement of the signal storage means used in the present invention.
Figure 16B:
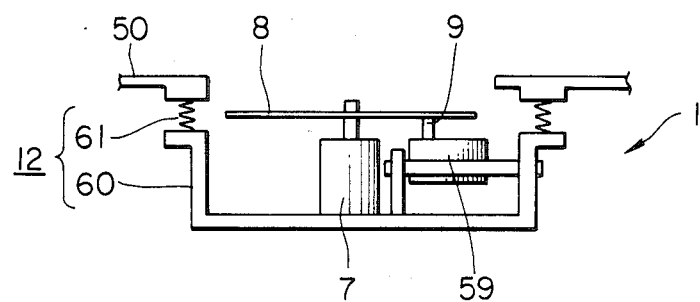

Referring to FIGS. 15, 16a and 16b, an embodiment of the vibration-absorbing means 12 will be described hereunder. As described above, in the vibration-absorbing mechanical means 12 it is necessary to cut off all the external vibration having the period of above a value of ⅛ period of the HS signal. Generally, the HS signal period of a video signal is about 63 μsec, therefore it is possible to efficiently cut off the vibrations including components in high frequency bands, if the cut-off frequency of the vibration absorbing means 12 is set at several KHz.

FIG. 15 shows an embodiment of a video image printer according to the present invention constituted by using a thermal head as the head assembly 6. In FIG. 15, items functionally corresponding to items in FIG. 1 are correspondingly referenced. In FIG. 15, in a housing 50, there are provided a circuit substrate 51 and a mechanism chassis 52 having such an arrangement and functions as described above. On the mechanism chassis 52, there is provided a printing mechanism 55 constituted by a platen 53, a paper feeding mechanism 54, etc. A paper 56 is inserted as shown by an arrow A, and the paper feeding/printing mechanism 55 is driven by a mechanism motor system (not shown), to cause the platen 53 to rotate as indicated by an arrow B, so that the paper 56 is fed also in the direction of the arrow B. The head assembly 6 is driven in the direction of an arrow C to reach a position indicated by a dotted line, so as to cause the paper 56 to abut on the platen 53. In the case in which the paper 56 is not a thermosensitive one, the paper 56 is pressed against the platen 53 through an inked paper which is applied with ink of a single color, or three colors of ink such as a cyanic color Cy, magenta Mg and yellow Ye, and held in a cartridge 57. Heater resistors 58 are arranged side by side in a position where the head assembly 6 causes the paper 56 to abut on the platen 53 and information of one print line stored in the line memory 4 is transferred to those resistors 58 through the signal converting/processing means 5, so that the resistors 58 generate heat in accordance with the information to perform one line printing on the paper 56. The printed paper 56 is discharged in the direction of an arrow D.

In the video image printer described above according to the present invention, there is provided a signal storage means 1 constituted by a magnetic sheet 8, a recording/reproducing head 9, a disc motor 7, etc. Referring to FIGS. 16a and 16b, the signal storage means 1 will be described.

In FIG. 16a, the video signal substantially instantly recorded on the magnetic sheet 8 rotated by the disc motor 7, is reproduced by the recording/reproducing head 9 when being printed. At this time, the relative position between a head displacing mechanism 59 for fixing/moving the recording/reproducing head 9 and the disc motor 7 for rotating the magnetic sheet 8, is fixed by a subchassis 60. The subchassis 60 is supported by springs 61. The subchassis 60 and the springs 61 constitute the vibration-absorbing means 12. A material sufficiently soft in comparison with the mechanism chassis 52 and the subchassis 60, such as rubber, styrol foam, or the like, other than the metalic springs shown in the drawing, may be used in place of the springs 61. In such an arrangement as described above, even in the case where the mechanism chassis 52 is mechanically vibrated, the signal storage means 1 can be prevented from being vibrated due to the components in a high frequency band in the above-mentioned constitution.

FIG. 16b illustrates another embodiment. In FIG. 16b, items functionally corresponding to items in FIG. 16a are correspondingly referenced. In this embodiment, a signal storage means 1 is supported on a housing 50 through springs 61 and it is possible to cut off high frequency band vibration components.

According to the embodiments of the present invention, a rotary type recording/reproducing means is used in place of a frame memory to thereby make it possible to perform the permanent preservation of stored information and to reduce the cost thereof. Further, there are provided mechanical and electrical countermeasures to cope with mechanical vibrations of the rotary type recording/reproducing means so as to divide a vibration absorbing frequency band into portions such that the mechanical and electrical countermeasures are directed to the high frequency and low frequency components of the mechanical vibrations, respectively, thereby making it possible to obtain a print picture in which no skew occurs against vibrations over all frequencies and and in which no mal-operation occurs due to lack of a synchronizing signal and/or generation of noises caused by the vibrations.

Figure 18:
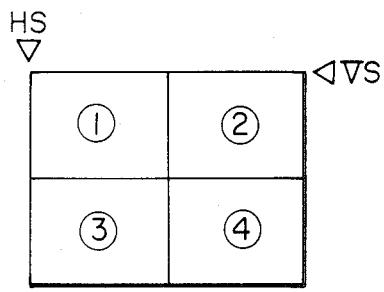
FIG. 18 is a diagram for explaining the video image printer of FIG. 17.
Figure 17:
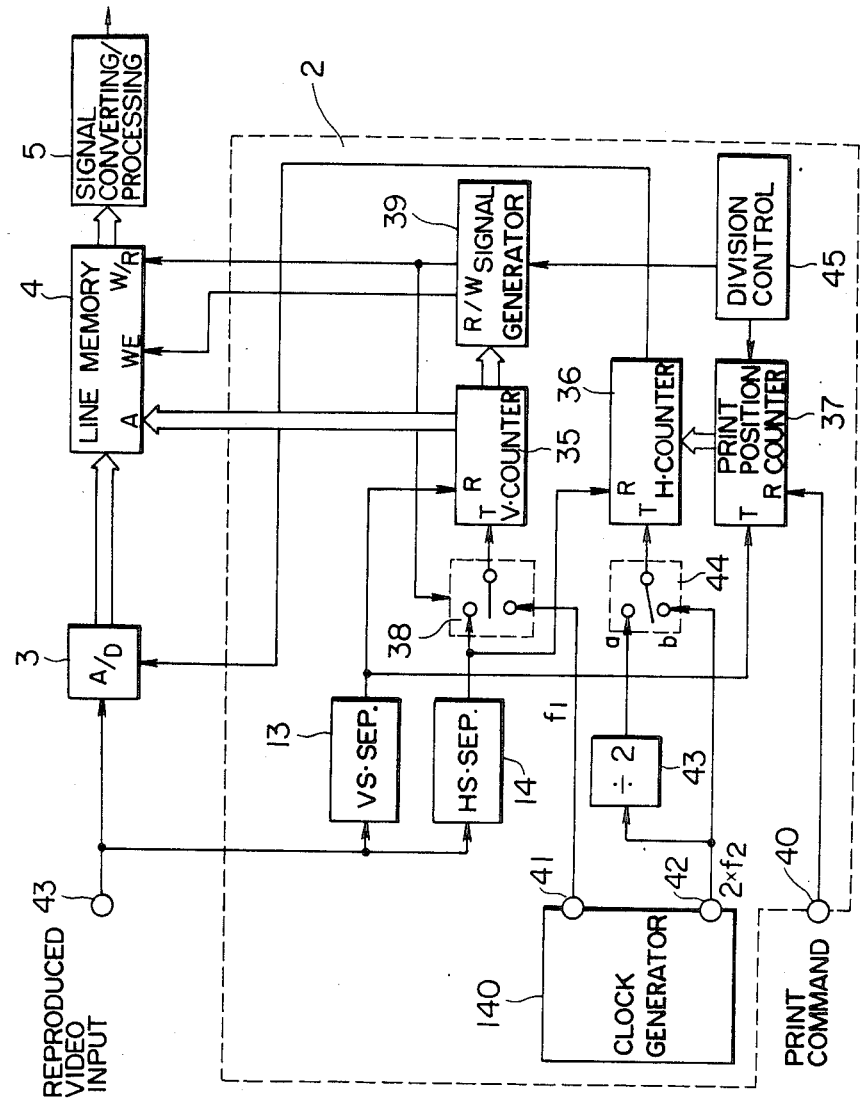
FIG. 17 is a block diagram showing another embodiment of the video image printer according to the present invention.

FIG. 17 shows another embodiment of the present invention which is applied to an enlarging printer. The drawing illustrates an embodiment of the signal processing means 2 in FIG. 1. In FIG. 17, items functionally corresponding to items in FIGS. 1, 2 and 4 are correspondingly referenced. The FIG. 17 embodiment is provided with a frequency bisection divider 43, a clock switch 44 and a division control means 45 in addition to the signal processing means 2 in FIG. 4. The frequency of the clock applied to the horizontal counter 36 from the clock generating means 140 is $2 \times f_2$, that is twice that in FIG. 4. In order to obtain a printed picture enlarged four times by using a thermal head 3 having an ordinary size, it is necessary to perform printing in such a manner that a picture is divided into four sections as shown in FIG. 18, and then these four divisions are compounded, for example, by moving a printing paper. The order of printing may be performed 24 different ways, however, the present embodiment will be described as to the printing operation performed in the order as shown in FIG. 18. It is necessary, therefore, to control the order of A/D conversion correspondingly.

In the printing operation with the four times enlargement, it is necessary to double the rate of A/D conversion in the horizontal and vertical directions in order to make the printing resolution constant. In FIG. 17, when the clock switch 44 is changed-over to the contact (b) by the frequency bisection divider 43, the clock frequency of the horizontal counter 36 is made twice in enlarging printing. That is, the A/D conversion rate in the horizontal direction is doubled. Even if the A/D conversion rate is made high in this manner, there occurs no deterioration in accuracy of the sampled horizontal video information, differing from the case of the conventional printer employing a semiconductor frame memory. As to the correction in the vertical direction, it is impossible to make high the A/D conversion rate because the number of scanning lines is fixed depending on the television system, (for example, the number of scanning lines in NTSC system is 525 per frame). There are correcting methods in which two identical data are printed, correction methods in which average data of adjacent ones are added, etc.

In FIG. 17, the frequency-division control means 45 operates in the following manner. A WE signal produced by a W/R signal generating means 39 and an A/D converting signal controlled by a print position counter 37 are changed over as shown in FIGS. 19a, 19b, 19c and 19d with respect to the divisions in FIG. 18. The W/R signal is the same as that in FIG. 6b. The WE signal is in its "H" level in the first half of the field period with respect to the divisions 1 and 2 (FIG. 12a), while in the latter half of the field period with respect to the divisions 3 and 4 (FIG. 19b). On the other hand, the A/D conversion signal is in its "H" level in the first half of the H period with respect to the divisions 1 and 3 (FIG. 19c), while in the latter half of the H period with respect to the divisions 2 and 4 (FIG. 19c). In FIG. 19c, the region in which the A/D converting signal is generated, is shown by a dotted line.

In this manner, the enlarging printing can be performed by making the A/D conversion rate high and the problem of the increase of resolution in the vertical direction can be solved by means of software.

It is necessary to move a head or a paper in the case of printing a picture having a width above twice the ordinary dimension by using a thermal head of the ordinary dimension. In this case, it is effective if an enlarging print system is employed in a platen-less system having no platen drum.

In the embodiments of the present invention as described above, signal recording/reproducing is realized by providing a sheet disc and a recording/reproducing head in a signal storage means, however, it is a matter of course that the recording/reproducing medium may be in the form of an optical recording/reproducing means such as an optical disc other than the magnetic recording/reproducing means. Further, description has been made as to an analog signal as the signal to be recorded/reproduced, however, it will be easily understood that the same effect can be obtained even in the case where digital information after A/D conversion is recorded/reproduced. Further, the image information storage is not limited only to a rotary storage medium, but applicable to other type magnetic recording mediums. For example, the present invention can be realized by utilizing a magnetic tape medium used in a video cassette recorder.

According to the present invention, it is possible to provide a printer in which recorded information can be kept and permanently preserved even when an electric power source is turned off, by employing a magnetic recording medium in place of a conventional semiconductor memory. Besides, there is such an effect that an inexpensive printer can be provided by using an inexpensive sheet disc or other recording medium without using a large number of expensive semiconductor memories. Further, it is possible to provide a printer which can be used for various purposes because a desired picture to be printed next can be memorized during a printing operation, which has been impossible in the conventional printer using a semiconductor memory, by using a sheet disc provided with a plurality of tracks.

What is claimed is:

1. A printer for printing a video image onto printing paper by utilizing a video signal, comprising:
   a storage means for receiving a plurality of video signals representing video images, and selectively storing a video signal representing a desired video image, said storage means including a rotatable recording/reproducing medium capable of being subjected to recording thereon and reproducing therefrom;
   means for rotating said rotatable medium;
   at least one recording/reproducing head means for recording the video signals representing the desired video image onto said rotatable medium and for repeatedly reproducing the recorded video signal from said rotatable medium;
   a signal processing means connected to said storage means for sampling the recorded video signal repeatedly reproduced from said storage means, and converting the reproduced video signal into a plurality of printing lines each constituting a part of the desired video image to be printed; and
   a printing head means connected to said signal processing means for successively printing said plurality of printing lines to form the desired video image onto printing paper.

2. A printer according to claim 1, wherein said storage means further includes a mechanical vibration-absorbing means for absorbing vibrations of said rotatable medium and said recording/reproducing head means.

3. A printer according to claim 1, wherein said signal processing means comprises:
   a horizontal synchronizing signal separator means for separating a horizontal synchronizing signal from the reproduced video signal;
   an automatic frequency control type horizontal synchronizing signal generator means connected to an output of said horizontal synchronizing signal separator means for generating a supplemental horizontal synchronizing signal;
   a detecting means connected to said horizontal synchronizing signal separator means for detecting when the separated horizontal synchronizing signal is lacking; and
   a selector means for selecting one of the separated horizontal synchronizing signal and the supplemental horizontal synchronizing signal, the latter signal being selected when said detecting means detects that the former signal is lacking.

4. A printer according to claim 1, wherein said signal processing means comprises:
   a fluctuation detector means for detecting a fluctuation of the repeatedly reproduced video signal;
   an oscillator means for producing an output having a frequency controlled by an output of said fluctuation detector means;
   a counter means for frequency-dividing the output of said oscillator means to control sampling timing of the reproduced video signal;
   a memory means for storing the converted printing line; and
   a memory control means connected to said memory means for controlling timing for writing into and reading out of said memory means.

5. A printer according to claim 1, wherein said signal processing means comprises:
   a horizontal synchronizing signal separator means for separating a horizontal synchronizing signal from the reproduced video signal;
   a flip-flop means responsive to an output of said horizontal synchronizing signal separator means to be set into one state;
   a gate means responsive to said one state of said flip-flop means for passing clock signal;
   a counter means for counting the clock signal passing through said gate means, and producing a noise-eliminated horizontal synchronizing signal at a predetermined count value, said flip-flop means being responsive to the noise-eliminated horizontal synchronizing signal from said counter means to be set into the other state to thereby close said gate means and reset said counter means.

6. A printer according to claim 1, further comprising means for producing a print command to be applied to said storage means, said print command instructing said storage means to record one frame of the desired video signal onto said rotatable medium.

7. A printer according to claim 6, wherein said print command instructs said storage means to record one frame of the desired video signal in synchronism with a rotational phase of said means for rotating said rotatable medium.

8. A printer according to claim 1, wherein a plurality of recording/reproducing tracks are formed on said rotatable recording/reproducing medium, and said at least one recording/reproducing head means comprises two or more recording/reproducing heads capable of recording onto and reproducing from different tracks of said rotatable medium independently of one another.

9. A printer according to claim 6, wherein said signal processing means includes:
- an A/D converter for successively sampling the reproduced video signal and converting the sampled video signal into a digital signal;
- a memory means for successively storing the digital signal to form the converted printing line; and
- a memory control means connected to said memory means for controlling timing for writing into and reading out of said memory means.

10. A printer according to claim 9, wherein said signal processing means comprises:
- a selector means for selecting one of at least two kinds of repetition frequencies of sampling timing of the reproduced video signal so as to vary the intervals of the converted print lines arranged in the horizontal direction of the desired video signal such that said repetition frequencies are made higher in an enlarging printing operation than the frequency in a normal operation; and
- a division control means for specifying a desired division of the desired video image and for controlling said A/D converter, said memory control means and said change-over means.

* * * * *